US011262218B2

United States Patent
Asakawa et al.

(10) Patent No.: US 11,262,218 B2
(45) Date of Patent: Mar. 1, 2022

(54) POSTURE ADJUSTING DEVICE (71) Applicant: MINEBEA MITSUMI Inc., Nagano (JP)

(72) Inventors: Toshiaki Asakawa, Shizuoka (JP); Shigeyuki Adachi, Shizuoka (JP); Atsushi Kitamura, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/260,352

(22) PCT Filed: Jul. 2, 2019

(86) PCT No.: PCT/JP2019/026338
§ 371 (c)(1),
(2) Date: Jan. 14, 2021

(87) PCT Pub. No.: WO2020/017323
PCT Pub. Date: Jan. 23, 2020

(65) Prior Publication Data
US 2021/0247210 A1    Aug. 12, 2021

(30) Foreign Application Priority Data
Jul. 20, 2018 (JP) .............................. JP2018-137188

(51) Int. Cl.
*G01D 5/16* (2006.01)
*A47C 31/12* (2006.01)
*A47C 7/46* (2006.01)

(52) U.S. Cl.
CPC .................. *G01D 5/16* (2013.01); *A47C 7/46* (2013.01); *A47C 31/126* (2013.01)

(58) Field of Classification Search
CPC ... A47C 7/00–748; G01L 1/146; G01L 1/148; B60N 2/00; B60N 2/22; B60N 2/2222; B60N 2/24
See application file for complete search history.

(56) References Cited

U.S. PATENT DOCUMENTS 5,170,364 A    12/1992  Gross et al.
8,348,339 B2 *  1/2013  Onuma ................ B60N 2/0232
                                                297/284.3
(Continued)

FOREIGN PATENT DOCUMENTS

JP    H01-253624    10/1989
JP    H02-141258    11/1990
(Continued)

OTHER PUBLICATIONS

International Search Report for PCT/JP2019/026338 dated Sep. 17, 2019.

Primary Examiner — Huy Q Phan
Assistant Examiner — David B Frederiksen
(74) Attorney, Agent, or Firm — IPUSA, PLLC (57) ABSTRACT

A posture adjusting device includes a support member with a pressure receiving surface to be pressed by a body of a user, multiple posture adjusting members each configured to change an uneven state of the pressure receiving surface, a sensor configured to output, when a given posture adjusting member is pressed by the body via the pressure receiving surface, a resistance value that constantly varies in accordance with a magnitude of a press force that is transferred via the given posture adjusting member, a drive unit configured to independently drive each of the multiple posture adjusting members, and a control unit configured to identify the pressed posture adjusting member based on the output of the sensor, and to control the drive unit to cause the pressed (Continued)

posture adjusting member to be moved or deformed to thereby cause the uneven state of the pressure receiving surface to change.

12 Claims, 9 Drawing Sheets

(56) References Cited

U.S. PATENT DOCUMENTS

| | | | | |
|---|---|---|---|---|
| 9,795,322 | B1* | 10/2017 | Karunaratne | A47C 7/62 |
| 10,085,570 | B2* | 10/2018 | Bellam | A47C 7/62 |
| 10,562,412 | B1* | 2/2020 | Main | A61B 5/1171 |
| 2006/0169863 | A1* | 8/2006 | Ohtsubo | B60N 2/0735 |
| | | | | 248/429 |
| 2010/0140998 | A1* | 6/2010 | Walker | A47C 7/029 |
| | | | | 297/284.1 |
| 2012/0001465 | A1* | 1/2012 | Rinne | A47C 7/024 |
| | | | | 297/284.3 |
| 2012/0098305 | A1* | 4/2012 | Yamaki | B60N 2/686 |
| | | | | 297/216.14 |
| 2016/0113583 | A1* | 4/2016 | Min | A61B 5/1036 |
| | | | | 600/587 |
| 2018/0271285 | A1 | 9/2018 | Park et al. | |
| 2019/0248260 | A1* | 8/2019 | Yoshikawa | B60N 2/2222 |

FOREIGN PATENT DOCUMENTS

| | | |
|---|---|---|
| JP | H05-337021 | 12/1993 |
| JP | 2007-240475 | 9/2007 |
| JP | 2017-215296 | 12/2017 |
| KR | 10-2017-0040985 | 4/2017 |

* cited by examiner

POSTURE ADJUSTING DEVICE

TECHNICAL FIELD

The present invention relates to a posture adjusting device.

BACKGROUND

Sensors are known in which a plurality of strain gauges are arranged vertically and horizontally to obtain predetermined information. Such a sensor is applied to various devices.

As an example, a break caution-point detector device for a camping sheet is used. In the break caution-point detector device, parameter data corresponding to a strain magnitude at a portion of a camping sheet where a corresponding strain gauge is situated is input from each of multiple strain gauges that is disposed on the camping sheet. Then, a break caution-point detecting unit in the break caution-point detector device detects which portion of the camping sheet is a break caution point based on the parameter data (see, for example, Patent document 1).

CITATION LIST

Patent Document

[Patent document 1] Japanese Unexamined Patent Application Publication No. 2017-215296

SUMMARY

However, a device for adjusting a user's posture is not applied to a chair and the like such as a chair with a support member (e.g., a backrest or the like) for supporting the body of the user.

In view of the point described above, an object of the present invention is to provide a posture adjusting device for adjusting a posture of a user.

A posture adjusting device includes a support member with a pressure receiving surface to be pressed by the body of a user, multiple posture adjusting members each configured to change an uneven state of the pressure receiving surface, a sensor configured to output, when a given posture adjusting member is pressed by the body via the pressure receiving surface, a resistance value that constantly varies in accordance with a magnitude of a press force that is transferred via the given posture adjusting member, a drive unit configured to independently drive each of the multiple posture adjusting members, and a control unit configured to identify the pressed posture adjusting member based on the output of the sensor, and to control the drive unit to cause the pressed posture adjusting member to be moved or deformed to thereby cause the uneven state of the pressure receiving surface to change.

Effects of the Invention

According to the disclosed technique, a posture adjusting device for adjusting a posture of a user can be provided.

DESCRIPTION OF EMBODIMENTS

One or more embodiments will be hereafter described with reference to the drawings. In each figure, the same numerals denote the same components and duplicative descriptions for the components may be omitted.

First Embodiment

Figure 1:
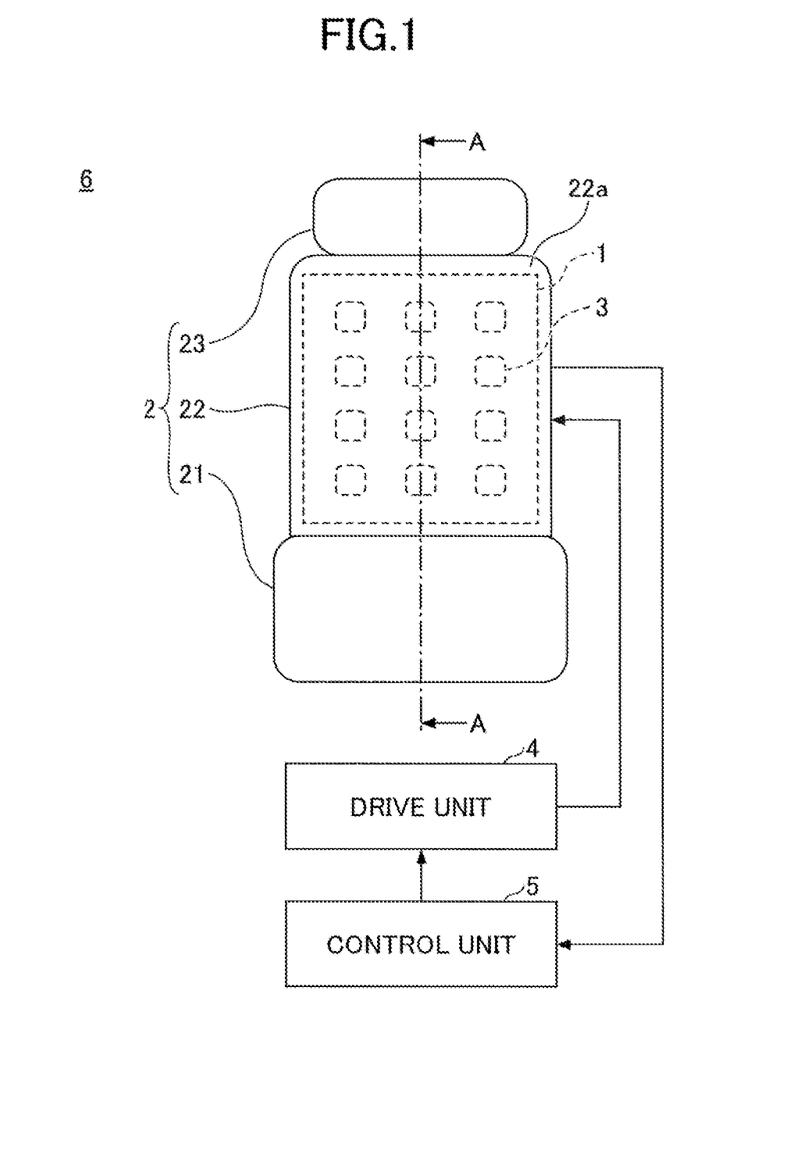
FIG. 1 is a front view illustrating an example of a posture adjusting device according to a first embodiment.
Figure 2:
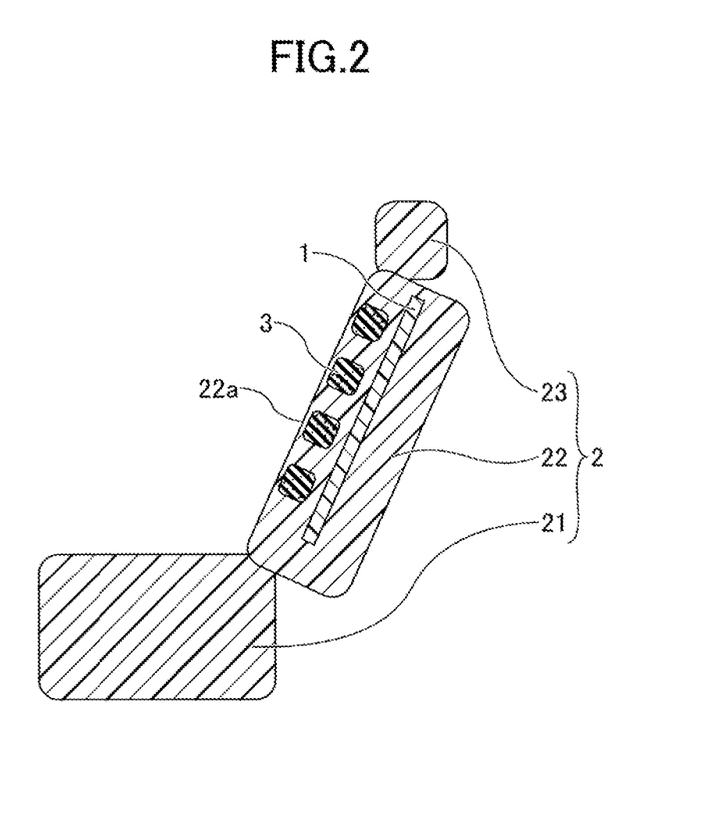
FIG. 2 is a cross-sectional view illustrating an example of the posture adjusting device according to the first embodiment.

FIG. 1 is a front view illustrating an example of a posture adjusting device according to a first embodiment, and some elements are schematically illustrated. FIG. 2 is a cross-sectional view illustrating an example of the posture adjusting device according to the first embodiment, and illustrates the cross section taken along the A-A line in FIG. 1. Note, however, that in FIG. 2, a drive unit 4 and a control unit 5 is not illustrated.

Referring to FIGS. 1 and 2, a posture adjusting device 6 includes a sensor 1, a seat 2, posture adjusting members 3, a drive unit 4, and a control unit 5. The seat 2 includes a seat cushion 21, a seat back 22, and a headrest 23.

In the posture adjusting device 6, the sensor 1 and the posture adjusting members 3 are embedded in the seat back 22 of the seat 2. The seat back 22 is a support member with a pressure receiving surface 22a to be pressed by a user's body on the seat 2. The seat 2 is, for example, an automotive seat, but is not limited thereto.

Each posture adjusting member 3 is a member that changes an uneven state of the pressure receiving surface 22a by moving in a direction approximately perpendicular to the pressure receiving surface 22a of the seat, back 22, or by deforming (expanding) by itself. The sensor 1 is disposed on the back side (side opposite to the pressure receiving surface 22a) of the posture adjusting members 3. When a given posture adjusting member 3 is pressed by a user's body on the seat 2, through the pressure receiving surface 22a, the sensor 1 outputs a resistance value that varies continuously in accordance with a magnitude of a press force that is transferred through the posture adjusting member 3.

The drive unit 4 has a function of independently driving each of the posture adjusting members 3. The control unit 5 has a function of identifying a pressed posture adjusting member 3 and detecting the magnitude of the press force, based on the output of the sensor 1. The control unit 5 also has a function of controlling the drive unit 4 and causing the pressed posture adjusting member 3 to be moved or deformed to thereby change an uneven state of the pressure receiving surface 22a. Note that the drive unit 4 and the control unit 5 may be embedded in the seat 2. Alternately, the drive unit 4 and the control unit 5 may be wholly or partially disposed outside of the seat 2.

Figure 3:
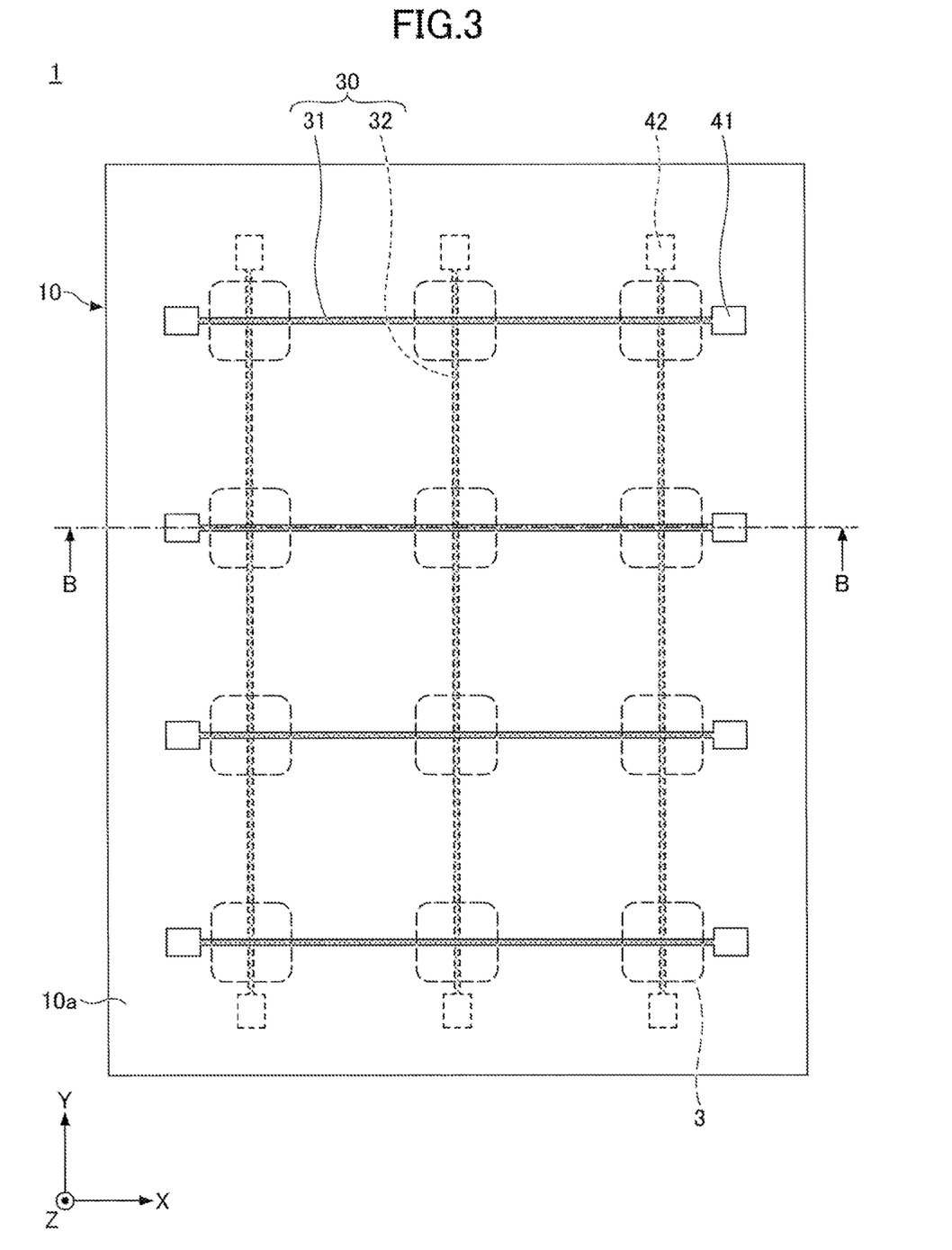
FIG. 3 is a plan view illustrating an example of a sensor in the posture adjusting device according to the first embodiment.
Figure 4:
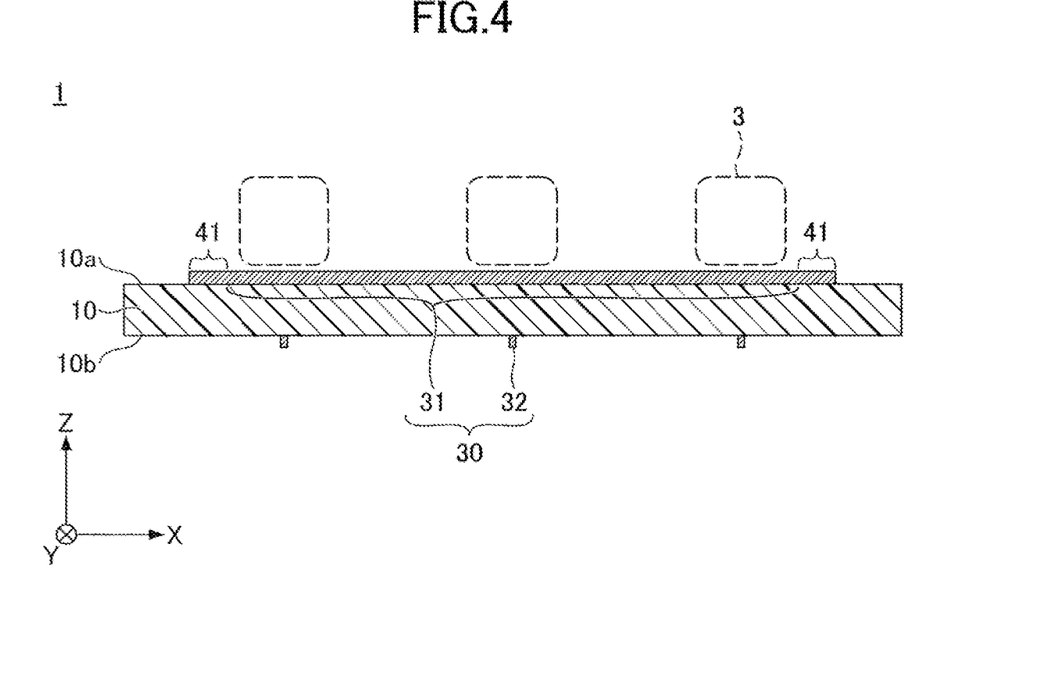
FIG. 4 is a cross-sectional view (first part) illustrating an example of the sensor in the posture adjusting device according to the first embodiment.

FIG. 3 is a plan view illustrating an example of the sensor of the posture adjusting device according to the first embodiment. FIG. 4 is a cross-sectional view illustrating an example of the sensor of the posture adjusting device according to the first embodiment, and illustrates the cross section taken along the B-B line in FIG. 3. Note that for the sake of convenience, in FIGS. 3 and 4, the posture adjusting members 3 are illustrated in order to show a positional relationship between the sensor 1 and each of the posture adjusting members 3.

Referring to FIGS. 3 and 4, the sensor 1 includes a substrate 10, a resistor 30 (multiple resistive portions 31 and 32), and multiple terminal sections 41 and 42.

Note that in the present embodiment, for the sake of convenience, in the sensor 1, the side of the substrate 10 where the resistive portions 31 are provided is referred to as an upper side or one side, and the side of the substrate 10 where the resistive portions 32 are provided is referred to as a lower side or another side. Further, for each component, the surface on the side where one or more resistive portions 31 are provided is referred to as one surface or an upper surface, and the surface on the side where one or more resistive portions 32 are provided is referred to as another surface or a lower surface. However, the sensor 1 can be used in a state of being upside down, or be disposed at any angle. Further, a plan view means that an object is viewed from a direction normal to an upper surface 10a of the substrate 10, and a planar shape refers to a shape of an object when viewed from the direction normal to the upper surface 10a of the substrate 10.

The substrate 10 is an insulating member that is a base layer for forming the resistor 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in terms of reducing variations in strain sensitivity of the resistive portions 31 and 32.

The substrate 10 can be formed of an insulating resin film such as a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

Note, however, that when the substrate 10 is not required to have insulation, the material such as $SiO_2$, $ZrO_2$ (including YSZ), Si, $Si_2N_3$, $Al_2O_3$ (including sapphire), ZnO, perovskite-based ceramics ($CaTiO_3$, $BaTiO_3$), or the like may be used for the substrate 10.

The resistor 30 is formed on the substrate 10 and is a sensitive element of which a resistance value varies continuously in accordance with the press force. The resistor 30 may be formed directly on each of the upper surface 10a and the lower surface 10b of the substrate 10, or may be formed above each of the upper surface 10a and the lower surface 10b of the substrate 10, through one or more other layers.

The resistor 30 includes resistive portions 31 and 32 that are laminated via the substrate 10. In such a case, the resistor 30 is a collective term for the multiple resistive portions 31 and 32. In particular, when the resistive portions 31 and 32 are distinguished from each other, they are referred to as the resistor 30. Note that in FIG. 3, for the sake of convenience, the resistive portions 31 and 32 are each illustrated in a crepe pattern.

The multiple resistive portions 31 are thin films of which the longitudinal direction of each is directed to the X direction and that are juxtaposed in the Y direction at predetermined intervals, on the upper surface 10a of the substrate 10. The multiple resistive portions 32 are thin films of which the longitudinal direction of each is directed to the Y direction and that are juxtaposed in the X direction at predetermined intervals, on the lower surface 10b of the substrate 10. Note, however, that the multiple resistive portions 31 and the multiple resistive portions 32 may interest while not being required to be perpendicular to each other in a plan view.

Each of the posture adjusting members 3 is disposed at a location overlapping with a portion at which a given resistive portion 31 and a given resistive portion 32 intersect, in a plan view. In such a case, the press force applied from the body of the user is transferred to the sensor 1 through a given posture adjusting member 3, and the resistive portions 31 and 32 at a corresponding location overlapping with the pressed posture adjusting member 3 in a plan view are pressed. Thus, a resistance value between a pair of electrodes associated with the pressed resistive portions 31 and 32 varies continuously in accordance with the magnitude of the press force. As a result, a given posture adjusting member 3 pressing the sensor 1 can be identified. Also, the magnitude of the force for a given posture adjusting member 3 to press the sensor 1 can be detected based on each resistance value.

The resistor 30 can be formed of, for example, material including Cr (chromium), material including Ni (nickel), or material including both of Cr and Ni. In other words, the resistor 30 can be formed of material including at least one among Cr and Ni. An example of the material including Cr includes a Cr composite film. An example of the material including Ni includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide.

The thickness of the resistor 30 is not particularly restricted, and can be appropriately selected for any purpose. The thickness can be, for example, approximately between 0.05 μm and 2 μm. In particular, when the thickness of the resistor 30 is 0.1 μm or more, it is preferable in terms of improvement in crystallinity (e.g., crystallinity of α-Cr) of a crystal that constitutes the resistor 30. When the thickness of the resistor 30 is 1 μm or less, it is further preferable in terms of reduction in cracks of a given film caused by internal stress of the film that constitutes the resistor 30, or reduction in warp in the substrate 10.

The width of the resistor 30 is not particularly restricted, and can be appropriately selected for any purpose. For example, when the resistor is narrow, the width can be approximately between 0.1 μm and 1 μm. A pitch between resistors 30 next to each other is not particularly restricted, and can be appropriately selected for any purpose. For example, the pitch can be approximately between 1 cm and 10 cm. Note that in FIGS. 3 and 4, four resistive portions 31 and three resistive portions 32 are illustrated. However, the number for each of the resistive portions 31 and the resistive portions 32 can be further increased as necessary.

For example, when the resistor 30 is the Cr composite film, the resistor is formed with α-Cr (alpha-chromium) as the main component having a stable crystalline phase, so that stability of a temperature coefficient of the resistor 30, or improvement of sensitivity of the resistor 30 with respect to the press force can be achieved. Here, a main component means that a target substance is 50% by weight or more of total substances that constitute the resistor. The resistor 30 preferably includes α-Cr at 80% by weight or more, from the viewpoint of the stability of the temperature coefficient of the resistor 30 or improvement of sensitivity of the resistor 30 with respect to the press force. Note that α-Cr is Cr having a bcc structure (body-centered cubic structure).

On the upper, surface 10a of the substrate 10, given terminal sections 41 respectively extend from both end portions of each resistive portion 31, and are each wider than the resistive portion 31 to be formed in an approximately rectangular shape, in a plan view. The terminal sections 41 are a pair of electrodes from which a change in a given resistance value of the resistive portion 31 in accordance with the press force is output externally, where, for example, a lead wire for external connection, or the like is joined. The upper surface of each terminal section 41 may be coated with a metal allowing for greater solderability than the terminal section 41. Note that for the sake of convenience, the resistive portions 31 and the terminal sections 41 are expressed by different numerals. However, a given resistive portion 31 and given terminal sections 41 can be integrally formed of the same material, in the same process.

On the lower surface 10b of the substrate 10, given terminal sections 42 respectively extend from both end portions of each resistive portion 32, and are each wider than the resistive portion 32 to be formed in an approximately rectangular shape, in a plan view. The terminal sections 42 are a pair of electrodes from which a change in a given resistance value of the resistive portion 32 in accordance with the press force is output externally, where, for example, a lead wire for external connection, or the like is joined. The upper surface of each terminal section 42 may be coated with a metal allowing for greater solderability than the terminal section 42. Note that for the sake of convenience, the resistive portions 32 and the terminal sections 42 are expressed by different numerals. However, a given resistive portion 32 and given terminal sections 42 can be integrally formed of the same material, in the same process.

Note that through interconnects (through holes) are provided through the substrate 10, and the terminal sections 41 and 42 may be collected on the upper surface 10a side or the lower surface 10b side of the substrate 10.

A cover layer (insulating resin layer) may be disposed on and above the upper surface 10a of the substrate 10, such that the resistive portions 31 are coated and the terminal sections 41 are exposed. A cover layer (insulating resin layer) may be also disposed on and above the lower surface 10b of the substrate 10, such that the resistive portions 32 are coated and the terminal sections 42 are exposed. By providing the cover layers, mechanical damage and the like can be prevented from occurring in the resistive portions 31 and 32. Further, by providing the cover layers, the resistive portions 31 and 32 can be protected against moisture and the like. Note that one or more cover layers may be provided to cover all portions except for the terminal sections 41 and 42.

The cover layer can be formed of an insulating resin such as a PI resin, an epoxy resin, a PEEK resin, a PEN resin, a PET resin, a PPS resin, or a composite resin (e.g., a silicone resin or a polyolefin resin). The cover layer may contain fillers or pigments. The thickness of the cover-layer is not particularly restricted, and can be appropriately selected for any purpose. For example, the thickness may be approximately between 2 μm and 30 μm.

In order to manufacture the sensor 1, first, the substrate 10 is prepared and the resistive portions 31 and the terminal sections 41 each of which has the planar shape illustrated in FIG. 3 are formed on the upper surface 10a of the substrate 10. The material and thickness for each of the resistive portions 31 and the terminal sections 41 are the same as the material and thickness described above. The resistive portions 31 and the terminal sections 41 can be integrally formed of the same material.

The resistive portions 31 and the terminal sections 41 can be formed, for example, such that a raw material capable of forming the resistive portions 31 and the terminal sections 41 is a target to be deposited by magnetron sputtering, and such that patterning is performed by photolithography. Instead of magnetron sputtering, the resistive portions 31 and the terminal sections 41 may be deposited by reactive sputtering, vapor deposition, arc ion plating, pulsed laser deposition, or the like.

From the viewpoint of achieving the stability of the temperature coefficient of each resistive portion 31 and improvement of sensitivity of the resistive portion 31 with respect to the press force, before depositing the resistive portions 31 and the terminal sections 41, preferably, as a base layer, a functional layer having a film thickness that is approximately between 1 nm and 100 nm is vacuum-deposited. The functional layer can be deposited by conventional sputtering, for example. Note that, after forming the resistive portions 31 and the terminal sections 41 on the entire upper surface of the functional layer, the functional layer, as well as the resistive portions 31 and the terminal sections 41, are patterned in the planar shape illustrated in FIG. 3, by photolithography.

In the present application, the functional layer refers to a layer that has a function of promoting crystal growth of the resistive portions that are at least an upper layer. The functional layer preferably further has a function of preventing oxidation of the resistive portions caused by oxygen and moisture included in the substrate 10, as well as a function of improving adhesion between the substrate 10 and each resistive portion. The functional layer may further have other functions.

The insulating resin film constituting the substrate 10 contains oxygen and moisture. In this regard, particularly when each resistive portion includes Cr, it is effective for the functional layer to have a function of preventing oxidation of the resistive portion, because Cr forms an autoxidized film.

The material of the functional layer is not particularly restricted as long as it is material having a function of promoting crystal, growth of the resistive portions that are at least an upper layer. Such material can be appropriately selected for any purpose, and includes one or more metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Ft (platinum), Pd (palladium), Ag (silver), Au (gold), Co (cobalt), Mn (manganese), and Al (aluminum); an alloy of any metals among the group; or a compound of any metal among the group.

Examples of the above alloy include FeCr, TiAl, FeNi, NiCr, CrCu, and the like. Examples of the above compound include TIN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and an Ar (argon) gas is supplied to a chamber. With use of conventional sputtering, the functional layer is deposited while the upper surface 10a of the substrate 10 is etched with Ar. Thus, a deposited amount of a film of the functional layer is minimized and thus the effect of improving adhesion can be obtained.

However, this is an example of a method of depositing the functional layer, and the functional layer may be formed by other methods. For example, as such a method, before depositing the functional layer, the upper surface 10a of the substrate 10 is activated by plasma treatment such as plasma treatment using Ar or the like, to thereby obtain the effect of improving the adhesion. Subsequently, the functional layer may be vacuum-deposited by magnetron sputtering.

A combination of the material of the functional layer, and the material of the resistive portions 31 and the terminal sections 41 is not particularly restricted, and can be appropriately selected for any purpose. For example, Ti is used for the functional layer, and a Cr composite film formed with α-Cr (alpha-chromium) as the main component can be deposited as the resistive portions 31 and the terminal sections 41.

In this case, each of the resistive portions 31 and the terminal sections 41 can be deposited by, for example, magnetron sputtering in which a raw material capable of forming the Cr composite film is the target and an Ar gas is supplied to a chamber. Alternatively, the resistive portions 31 and the terminal sections 41 may be deposited by reactive sputtering in which pure Cr is the target and an appropriate amount of nitrogen gas, as well as an Ar gas, are supplied to a chamber.

In such methods, a growth surface of the Cr composite film is defined by the functional layer formed of Ti, and a Cr composite film that is formed with α-Cr as the main component having a stable crystalline structure can be deposited. Also, Ti that constitutes the functional layer is diffused into the Cr composite film, so that stability of the temperature coefficient of each resistive portion 31 and improvement of sensitivity of the resistive portion 31 with respect to a given press force can be achieved. Note that, when the functional layer is formed of Ti, the Cr composite film may include Ti or TiN (titanium nitride).

Note that when each resistive portion 31 is a Cr composite film, the functional layer formed of Ti includes ail functions of a function of promoting crystal growth of the resistive portion 31, a function of preventing oxidation of the resistive portion 31 caused by oxygen or moisture contained in the substrate 10, and a function of improving adhesion between the substrate 10 and the resistive portion 31. Instead of Ti, when the functional layer is formed of Ta, Si, Ai, or Fe, the functional layer also includes the same functions.

As described above, by providing the functional layer in the lower layer of the resistive portions 31, crystal growth of the resistive portions 31 can be promoted and thus the resistive portions 31 each having a stable crystalline phase can be fabricated. As a result, in the sensor 1, stability of the temperature coefficient of each resistive portion 31 and improvement of sensitivity of each resistive portion 31 with respect to a given press force can be achieved.

Next, the resistive portions 32 and the terminal sections 42 each of which has the planar shape illustrated in FIG. 3 are formed on the lower surface 10b of the substrate 10. The resistive portions 32 and the terminal sections 42 can be formed in the same method as the resistive portions 31 and the terminal sections 41. Likewise, the functional layer as a base layer is preferably vacuum-deposited before depositing the resistive portions 32 and the terminal sections 42.

After forming the resistive portions 31 and the terminal sections 41, and the resistive portions 32 and the terminal sections 42, a given cover layer with which the resistive portions 31 are coated and that exposes the terminal sections 41 may be provided on and above the upper surface 10a of the substrate 10, and further, a given cover layer with which the resistive portions 32 are coated and that exposes the terminal sections 42 may be provided on and above the lower surface 10b of the substrate 10. As a result, the sensor 1 is completed.

A given cover layer can be fabricated, such that a thermosetting insulating resin film in a semi-cured state is laminated on the upper surface 10a of the substrate 10, and such that the resistive portions 31 are coated therewith and the terminal sections 41 are exposed and subsequently, heat is added and curing is performed. Further, a given cover layer can be fabricated, such that a thermosetting insulating resin film in a semi-cured state is laminated on the lower surface 10b of the substrate 10, and such that the resistive portions 32 are coated therewith and the terminal sections 42 are exposed and subsequently, heat is added and curing is performed. Instead of use of a laminated insulating resin film, a given cover layer may be formed such that a thermosetting insulating resin that is liquid or paste-like is applied and subsequently, heat is added and curing is performed.

Figure 5:
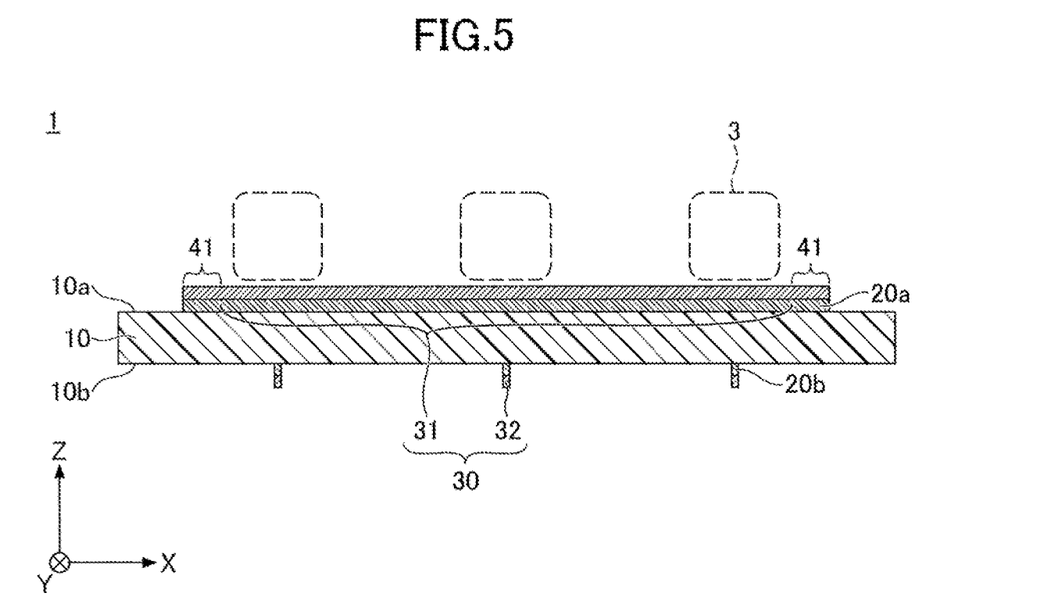
FIG. 5 is a cross-sectional view (second part) illustrating an example of the sensor in the posture adjusting device according to the first embodiment.

Note that when a given functional layer as a base layer of the resistive portions 31 and the terminal sections 41 is provided on the upper surface 10a of the substrate 10, and a given functional layer as a base layer of the resistive portions 32 and the terminal sections 42 is provided on the lower surface 10b of the substrate 10, the sensor 1 has the cross-section shape illustrated in FIG. 5. Layers expressed by the numerals 20a and 20b indicate the respective functional layers. The planar shape of the sensor 1 in the case of providing the functional layers 20a and 20b is the same as that in FIG. 3.

Figure 6:
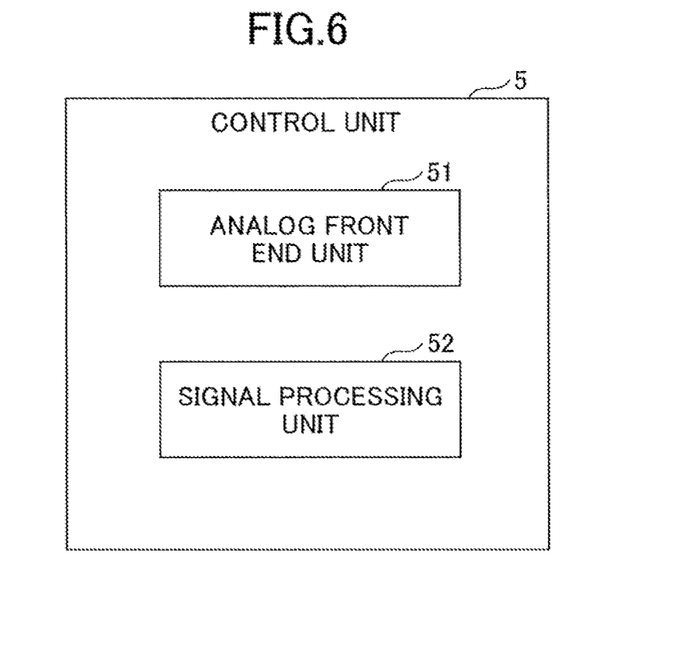
FIG. 6 is a block diagram illustrating an example of a control unit in the posture adjusting device according to the first embodiment.

FIG. 6 is a block diagram illustrating an example of the control unit of the posture adjusting device according to the first embodiment. In the posture adjusting device 6, the terminal sections 41 and 42 of the sensor 1 are each connected to the control unit 5, by using, for example, a flexible substrate, a lead wire, or the like.

Based on information obtained through given terminal sections 41 and 42 of the sensor 1, the control unit 5 can detect a location at which the sensor 1 of the posture adjusting device 6 is pressed, as well as a given magnitude of the press force. That is, one or more posture adjusting members 3 pressing the sensor 1 are identified, and the magnitude of the force for each posture adjusting member 3 to press the sensor 1 can be detected.

For example, the control unit 5 may include an analog front end unit 51 and a signal processing unit 52.

The analog front end unit 51 includes, for example, an input signal selection switch, a bridge circuit, an amplifier, an analog-to-digital conversion circuit (A/D conversion circuit), and the like. The analog front end unit 51 may include a temperature compensation circuit.

In the analog front end unit 51, for example, all of the terminal sections 41 and 42 of the sensor 1 are connected to the input signal selection switch, and a pair of electrodes is selected by the input signal selection switch. A given pair of electrodes selected by the input signal selection switch is connected to the bridge circuit.

In such a case, one side of the bridge circuit is comprised of a given resistive portion between a given pair of electrodes selected by the input signal selection switch, and the other three sides are each comprised of fixed resistance. With such a configuration, as the output of the bridge circuit, a voltage (analog signal) corresponding to a resistance value of the resistive portion between a given pair of electrodes selected by the input signal selection switch can be obtained. Note that the input signal selection switch is configured to be able to be controlled by the signal processing unit 52.

An output voltage of the bridge circuit is amplified by the amplifier and then is converted to a digital signal by the A/D conversion circuit. The digital signal is transmitted to the signal processing unit 52. When the analog front end unit 51 includes a temperature compensation circuit, a digital signal for which temperature compensation is performed is transmitted to the signal processing unit 52. By performing switching through the input signal selection switch at high speed, digital signals corresponding to resistance values associated with all of the terminal sections 41 and 42 of the sensor 1 can be transmitted to the signal processing unit 52 in an extremely short amount of time.

Based on information transmitted from the analog front end unit 51, the signal processing unit 52 can identify one or more posture adjusting members 3 pressing the sensor 1, as well as detecting the magnitude of the force for a corresponding posture adjusting member 3 to press the sensor 1.

When resistance values for multiple resistive portions 31 or resistance values for multiple resistive portions 32 are varied, it can be detected that the sensor 1 is pressed at corresponding multiple locations.

The signal processing unit 52 can include, for example, a central processing unit (CPU), a read only memory (ROM), a random access memory (RAM), a main memory, and the like.

In this case, various functions of the signal processing unit 52 can be implemented by executing a program stored in the ROM or the like, where the program is read out to a main memory and is executed by the CPU. However, a portion or all of the signal processing unit 52 may be implemented by hardware only. The signal processing unit 52 may be also configured physically by a plurality of devices or the like.

In the posture adjusting device 6, the drive unit 4 can be selected corresponding to a given posture adjusting member 3. For example, when the posture adjusting member 3 is an air bag, an electrically operated air pump having a function of driving a valve can be used as the drive unit 4.

In this case, each of the posture adjusting members 3 is connected to the air pump via a valve, by using an individual pipe line. Further, pressure of each posture adjusting member 3 is preliminarily adjusted to predetermined air pressure.

When a given posture adjusting member 3 is pressed, the control unit 5 identifies the pressed posture adjusting member 3 based on the output of the sensor 1. Then, the control unit 5 controls the drive unit 4 to control the opening or closing of a given valve of the pipe line that is connected to the pressed posture adjusting members 3. Thus, air pressure of the pressed posture adjusting member 3 is adjusted to an appropriate value, so that the posture adjusting member 3 is expanded.

Figure 7:
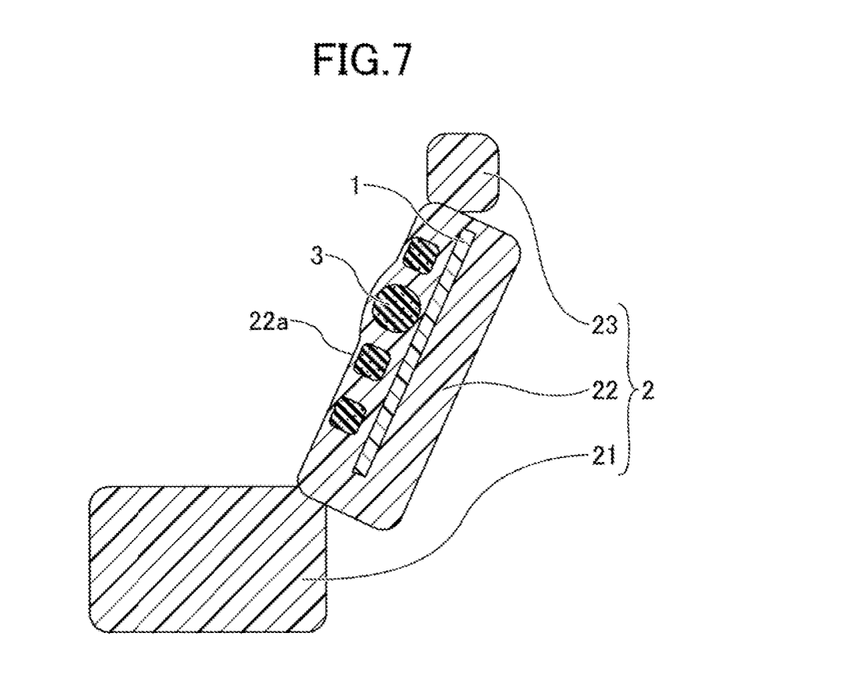
FIG. 7 is a diagram for describing a change in an uneven state of a pressure receiving surface of the posture adjusting device according to the first embodiment.

For example, as illustrated in FIG. 7, the expanded posture adjusting member 3 can change the uneven state of the pressure receiving surface 22a. In this case, each posture adjusting member 3 can be controlled such that an expansion amount of the posture adjusting member increases as the output of the sensor 1 increases.

For example, a relationship between the output of the sensor 1 detected by the control unit 5 and appropriate air pressure of a given posture adjusting member 3 can be stored using a table in a storage unit in the signal processing unit 52. In such a configuration, by referring to the table, the control unit 5 can adjust the air pressure of the posture adjusting member 3 to an appropriate value, based on the output of the sensor 1.

Note that the case where the air bag is used as each posture adjusting member 3 and the electrically operated air pump is used as the drive unit 4 is an example and is not limiting. For example, each posture adjusting member 3 is formed of rubber such as silicone rubber, a polymeric material such as polyurethane, or the like, and a configuration in which the posture adjusting member 3 is moved (reciprocated) using a linear motor, an electromagnetic solenoid, or the like, which is used as the drive unit 4, can be provided.

As described above, in the posture adjusting device 6, the sensor 1 detects a change in the posture of the user and one or more among the posture adjusting members 3 embedded in the seat back 22 are moved or deformed. With such a configuration, a state of the pressure receiving surface 22a is changed to an uneven state corresponding to the posture of the user. For example, when load (press force) applied on the left side of the back is detected to be increased, one or more posture adjusting members 3 at corresponding locations are moved or deformed, and thereby the uneven state of the pressure receiving surface 22a is changed such that a portion corresponding to the left side of the back is pushed back. Accordingly, user fatigue can be reduced.

In the posture adjusting device 6, three-dimensional information obtained through the sensor 1 is transmitted to the control unit 5. Based on the three-dimensional information obtained through the sensor 1, the control unit 5 can identify one or more posture adjusting members 3 pressing the sensor 1 and detect the magnitude of the force for a given posture adjusting member 3 to press the sensor 1.

In particular, when the resistive portions 31 and 32 are each formed of a Cr composite film, sensitivity of a resistance value with respect to a force (a change amount of the resistance value for each of the resistive portions 31 and 32 with respect to the same press force) is significantly improved in comparison to a case where the resistive portions 31 and 32 are each formed of Cu—Ni or Ni—Cr. When the resistive portions 31 and 32 are each formed of the Cr composite film, sensitivity of the resistance value with respect to the force is about 5 to 10 times greater than that in a case where the resistive portions 31 and 32 are each formed of Cu—Ni or Ni—Cr. For this reason, by forming each of the resistive portions 31 and 32 of a Cr composite film, one or more posture adjusting members 3 pressing the sensor 1 can be identified with great reliability. Further, the magnitude of the force for a given posture adjusting member 3 to press the sensor 1 can be detected with high sensitivity.

When sensibility of the resistance value with respect to a given force is increased, a control is achieved such that a movement amount and a deformation amount of a given posture adjusting member 3 are varied depending on a case of detecting a decreased force, a case of detecting a middle force, or a case of detecting an increased force. Alternatively, when the magnitude of the force is less than or equal to a fixed magnitude, a control is achieved such that a given posture adjusting member 3 is not moved or deformed.

When sensibility of the resistance value with respect to a given force is increased, a signal with increased S/N can be obtained. Thus, signal detection can be performed accurately even when the number of times the A/D conversion circuit of the analog front end unit 51 performs averaging is reduced. By reducing the number of times the A/D conversion circuit performs averaging, a time required for one A/D conversion can be decreased, so that the input signal selection switch can perform switching at a higher speed. As a result, fast movement transferred to the posture adjusting device 6 can also be detected.

Note that in the above description, an example in which the sensor 1 and the posture adjusting members 3 are embedded in the seat back 22 of the seat 2, is illustrated. However, the sensor 1 and the posture adjusting members 3 can be embedded in any one or more among the seat cushion 21, the seat back 22, and the headrest 23 of the seat 2. Further, without embedding the sensor 1 and the posture adjusting members 3 in the seat 2, the sensor 1 and the posture adjusting members 3 are embedded in, for example, a seat cover that is separate from the seat 2, and the sensor 1 and the posture adjusting members 3 may be disposed with respect to the seat 2. The posture adjusting device can be applied to an object (e.g., a bed or the like) other than the seat, when the posture adjusting device has a support member with a pressure receiving surface that is pressed by the body of the user.

First Modification of the First Embodiment

The first modification of the first, embodiment provides an example in which the sensor has an electronic component that is provided on one surface side or another surface side of the substrate. Note that, in the first modification of the first embodiment, the description for the same components as the embodiment described previously may be omitted.

Figure 8:
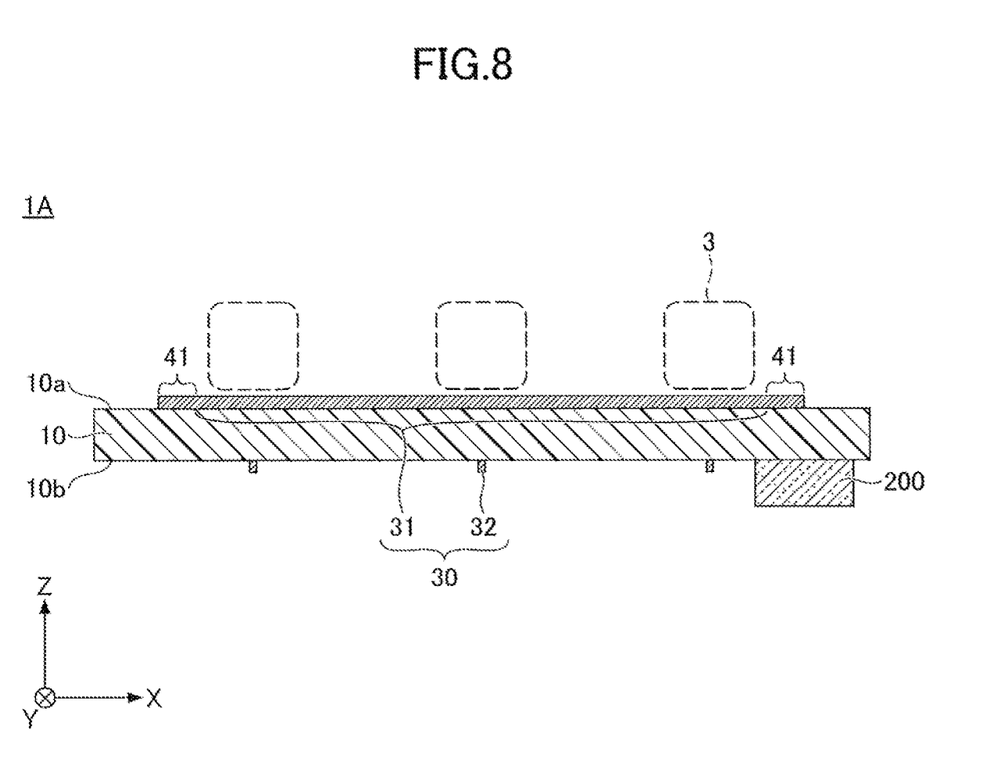
FIG. 8 is a cross-sectional view illustrating an example of the sensor in the posture adjusting device according to the first modification of the first embodiment.

FIG. 8 is a cross-sectional view illustrating an example of the sensor according to the first modification of the first embodiment, and illustrates the cross section corresponding to FIG. 4. Referring to FIG. 8, a sensor 1A differs from the sensor 1 (see FIGS. 3 and 4) in that an electronic component 200 is provided on the lower surface 10b of the substrate 10.

The electronic component 200 has an external communication function (for example, a serial communication function such as I²C) by, for example, forming the analog front end unit 51 illustrated in FIG. 6 with an IC. In this case, the electronic component 200 is an IC having, for example, an input signal selection switch, a bridge circuit, an amplifier, an A/D conversion circuit, an external communication function, and the like. The electronic component 200 can convert a resistance value between a pair of electrodes associated with each of the resistive portions 31 and 32, into a voltage and then output a converted voltage as a digital signal. The electronic component 200 may include a temperature compensation circuit. The electronic component 200 can transmit and receive information with respect to the signal processing unit 52 of the control unit 5, through the external communication function.

The electronic component 200 can be provided as a flip chip on, for example, a pad formed on the lower surface 10b of the substrate 10. Alternatively, the electronic component 200 is provided above the lower surface 10b of the substrate 10 via an adhesive layer such as a die attach film, and may be joined to a pad formed on the lower surface 10b of the substrate 10, through wire bonding. In addition to the electronic component 200, a passive component such as a capacitor may also be provided.

The electronic component 200 is connected to all of the terminal sections 41 and 42 via one or more interconnect patterns or through-holes (through-holes), which are not illustrated. The electronic component 200 is also configured to be able to be powered from outside of the sensor 1A.

A cover layer (insulating resin layer) may be provided on and above the upper surface 10a of the substrate 10 to cover the resistive portions 31 and the terminal sections 41. A cover layer (insulating resin layer) may be also provided on and above the lower surface 10b of the substrate 10 to cover the resistive portions 32, the terminal sections 42, and the electronic component 200. By providing the cover layers described above, mechanical damage and the like can be prevented from occurring in the resistive portions 31 and 32, the terminal sections 41 and 42, and the electronic component 200. Further, by providing the cover layers, the resistive portions 31 and 32, the terminal sections 41 and 42, and the electronic component 200 can be protected against moisture and the like.

As described above, in the sensor 1A, the electronic component 200 is provided on the substrate 10 and thus the terminal sections 41 and 42 can be each connected to the electronic component 200 through an interconnect pattern or a through-interconnect (through-hole), at a short distance therebetween. Accordingly, the sensor 1A can be decreased in size. Such a structure is particularly effective for a small sensor for which a resistor and an electric component are difficult to be connected together via a lead wire, with solder or the like.

Further, noise resistance can be improved by decreasing a distance from a given terminal section among the terminal, section 41 and 42, to the electronic component 200.

Note that in FIG. 8, an example in which the electronic component 200 is provided on the lower surface 10b of the substrate 10 is illustrated. However, the electronic component 200 may be provided on the upper surface 10a of the substrate 10. The electronic component 200 is not limited to an IC having the function of the analog front end unit 51. For example, the electronic component 200 may be an IC having the function of the analog front end unit 51 and the signal processing unit 52.

A portion or all of the control unit 5 may be integrated with the sensor 1A. Here, integration with the sensor 1A covers a case where a portion or all of a substrate and an electronic component used in the control unit 5 are shared with a portion or all of a substrate and an electronic component used in the sensor 1A.

Second Modification of the First Embodiment

The second modification of the first embodiment provides an example in which the resistive portions of the sensor are each disposed in a zigzag pattern. Note that in the second modification of the first embodiment, the description for the same components as the embodiments described previously may be omitted.

Figure 9:
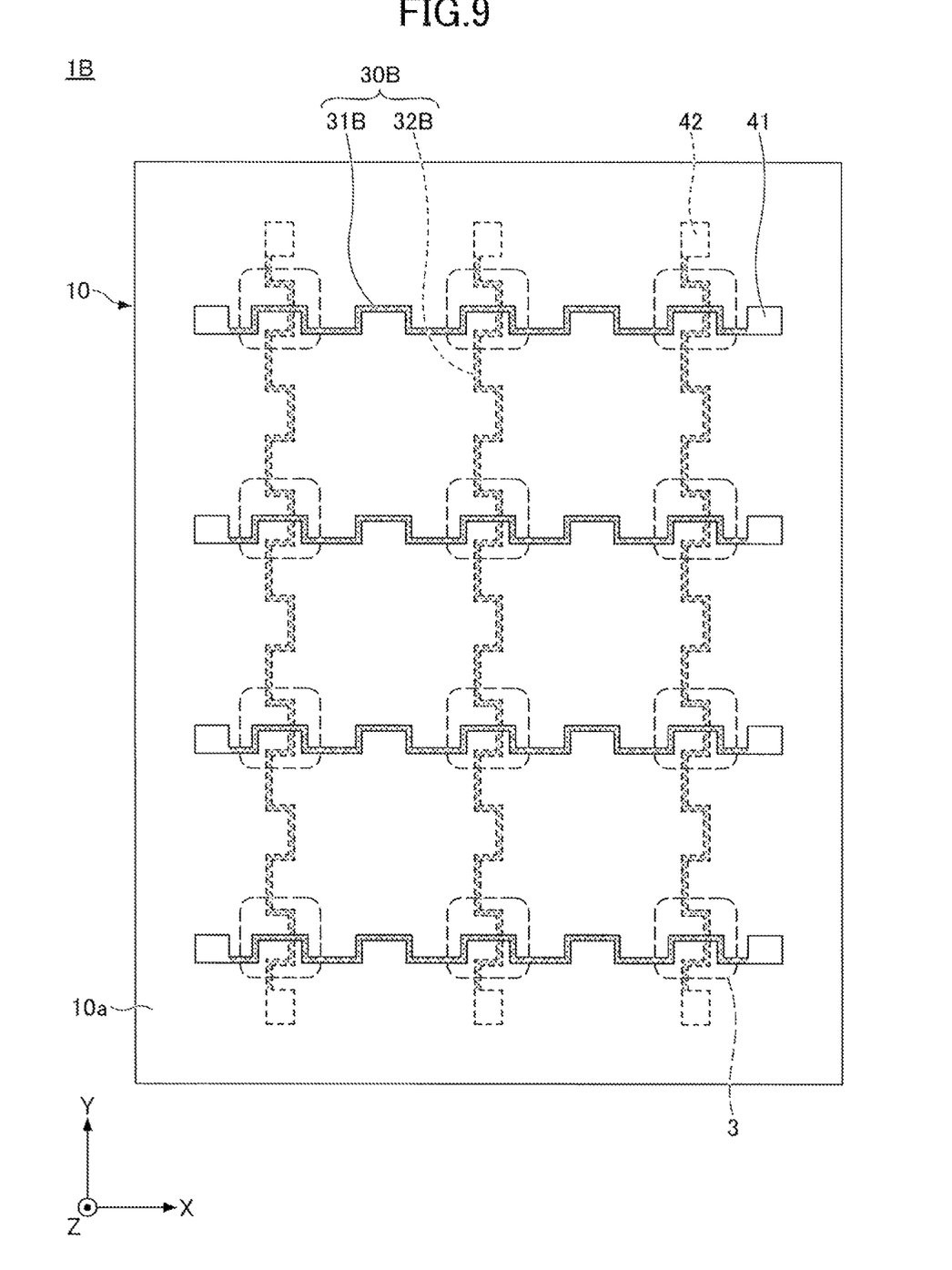
FIG. 9 is a plan view illustrating an example of the sensor in the posture adjusting device according to the second modification of the first embodiment.

FIG. 9 is a plan view illustrating an example of the sensor according to the second modification of the first embodiment, and illustrates the plane corresponding to FIG. 3. Note that in FIG. 9, for the sake of convenience, the posture adjusting members 3 are illustrated in order to show a positional relationship between the sensor 1B and each of the posture adjusting members 3. Referring to FIG. 9, the sensor 1B differs from the sensor 1 (see FIGS. 3 and 4) in that a resistor 308 is used instead of the resistor 30.

The resistor 30B includes resistive portions 31B and 32B. Each resistive portion 31B is disposed in a zigzag pattern formed between a pair of given terminal sections 41. Each resistive portion 32B is also disposed in a zigzag pattern formed between a pair of given terminal sections 42. For example, the material and thickness for each of the resistive portions 31B and 32B can be the same as the material and thickness for each of the resistive portions 31 and 32.

In such a configuration, when the resistive portions 31B and 32B are each disposed in a zigzag pattern, a resistance value between a given pair of terminal sections 41 and a resistance value between a given pair of terminal sections 42 can be increased in comparison to a case where the resistive portions 31B and 32B are each disposed in a linear pattern. As a result, when pressed, a change amount of the resistance value between a given pair of terminal sections 41, and a change amount of the resistance value between a given pair of terminal sections 42, are increased. Thus, one or more posture adjusting members 3 pressing the sensor 1B can be identified with greater reliability, and the magnitude of the force for a given posture adjusting member 3 to press the sensor 1B can be detected with greater sensitivity.

Further, the resistance value between a given pair of terminal sections 41 and the resistance value between a given pair of terminal sections 42 can be increased, thereby enabling power consumption for the sensor 1B to be reduced.

Third Modification of the First Embodiment

The third modification of the first embodiment provides an example in which a sensor with a different structure from the structure described in the first embodiment is used. Note that in the third modification of the first embodiment, the description for the same components as the embodiments described previously may be omitted.

Figure 10:
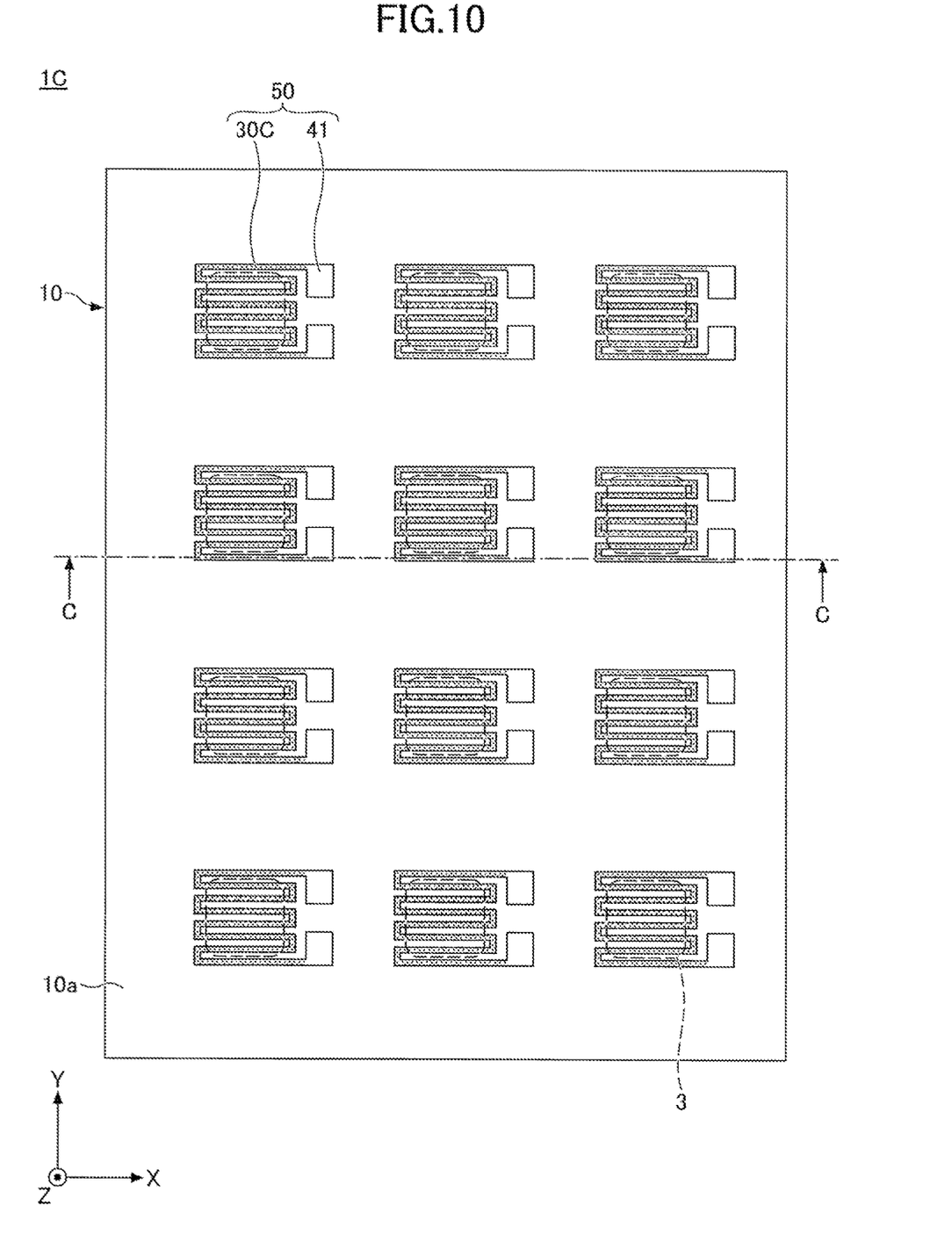
FIG. 10 is a plan view illustrating an example of the sensor in the posture adjusting device according to the third modification of the first embodiment.
Figure 11:
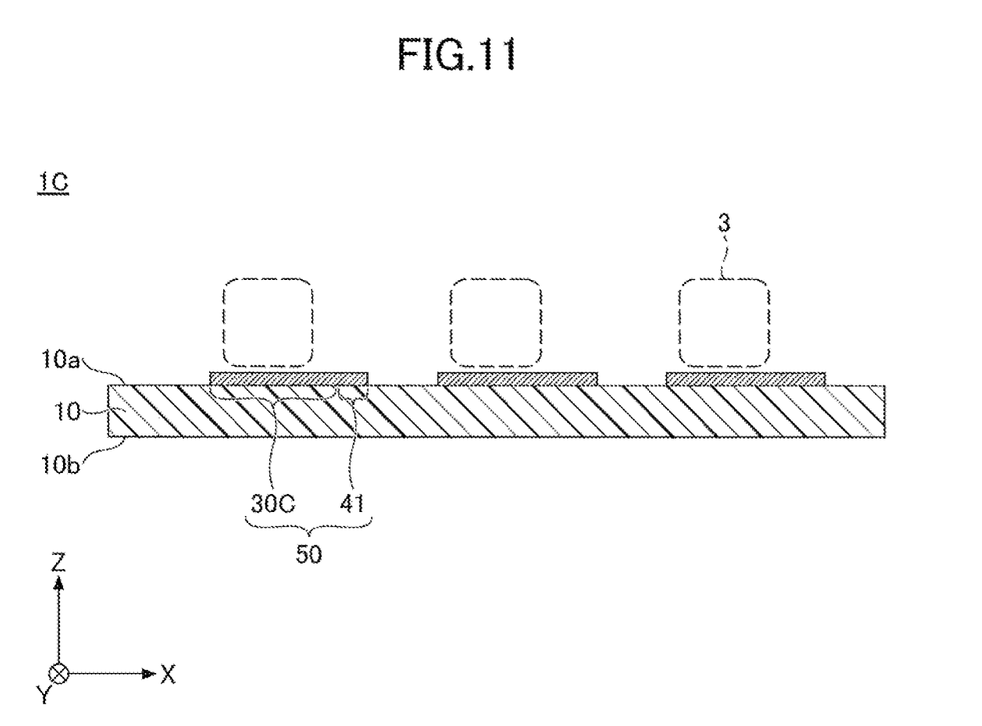
FIG. 11 is a cross-sectional view illustrating an example of the sensor in the posture adjusting device according to the third modification of the first embodiment.

FIG. 10 is a plan view illustrating an example of the sensor of the posture adjusting device according to the third modification of the first embodiment. FIG. 11 is a cross-sectional view illustrating an example of the sensor of the posture adjusting device according to the third modification of the first embodiment, and illustrates the cross section taken along the C-C line in FIG. 10. Note that in FIGS. 10 and 11, for the sake of convenience, the posture adjusting members 3 are illustrated in order to show a positional relationship between a sensor 1C and each of the posture adjusting members 3.

Referring to FIGS. 10 and 11, the sensor 1C is a collector of individual sensors 50 that are assigned to the respective posture adjusting members 3. In such a configuration, the sensor 1C includes the number of individual sensors 50 that is equal to the number of posture adjusting members 3.

Each individual sensor 50 includes a substrate 1 in common with all individual sensors 50, and includes a resistor 30C and terminal sections 41, which are provided for the individual sensor 50. The resistor 30C is disposed in a zigzag pattern formed between a pair of the terminal sections 41. The resistor 30C and terminal sections 41 may be formed directly on the upper surface 10a of the substrate 10, or may be formed above the upper surface 10a of the substrate 10 through one or more other layers. Note that in FIG. 10, for the sake of convenience, each resistor 30C is illustrated in a crepe pattern. For example, the material and thickness for each resistor 30C can be the same as the material and thickness for each of the resistive portions 31 and 32.

Each posture adjusting member 3 is disposed at a location overlapping with a given individual sensor 50 in a plan view. Thus, a press force applied from the body of the user is transferred to one or more given individual sensors 50 through corresponding posture adjusting members 3, and the resistors 30C a locations overlapping with pressed posture adjusting members 3 in a plan view, are pressed. With such a configuration, a resistance value between a pair of terminal sections 41 associated with each of the pressed resistors 30C varies continuously in accordance with the magnitude of a given press force. As a result, one or more posture adjusting members 3 pressing the individual sensors 50 can be identified. Also, the magnitude of the force for a given posture adjusting member 3 to press the individual sensor 50 can be detected based on the resistance value of a corresponding resistor 30C. As described above, a given individual sensor 50 may be disposed for each of the posture adjusting members 3.

The preferred embodiment and the like have been described above in detail, but are not limiting. Various modifications or substitutions to the embodiment and the like described above can be made without departing from a scope set forth in the claims.

For example, an example of the sensor 1 in which the resistive portions 31 are provided on the upper surface 10a of the substrate 10 that is an insulating layer, and the resistive portions 32 are provided on the lower surface 10b thereof, is illustrated. However, such an example is not limiting as long as there is a structure in which the resistive portions 32 are provided on one side of an insulating layer, and the resistive portions 32 are provided on another side of the insulating layer. For example, the resistive portions 31 are provided on the upper surface 10a of the substrate 10, an insulating layer with which the resistive portions 31 are coated is provided above the upper surface 10a of the substrate 10, and the resistive portions 32 may be provided on the insulating layer. Further, a first substrate on which the resistive portions 31 are provided, and a second substrate on which the resistive portions 32 are provided, are fabricated, and then the first substrate on which the resistive portions 31 are provided and the second substrate on which the resistive portions 32 are provided may be bonded together such that the resistive portions 31 and resistive portions 32 face inward and an insulating layer is interposed between the first substrate and the second substrate. Also, a first substrate on which the resistive portions 31 are provided, and a second substrate on which the resistive portions 32 are provided, are fabricated, and then the first substrate on which the resistive portions 31 are provided and the second substrate on which the resistive portions 32 are provided may be laminated in the same direction. The same configurations described above apply to each of the sensors 1A and 1B.

Further, in the posture adjusting device 6, one or more elongated posture adjusting members 3 may be provided along one or more given resistive portions near the pressure receiving surface 22a, among the resistive portions 31 and resistive portions 32. In this case, by providing one elongated posture adjusting member 3 for each of resistive portions near the pressure receiving surface 22a, even when only a given resistive portion near the pressure receiving surface 22a is pressed, a pressed posture adjusting member 3 can be identified.

This International Application claims priority to Japanese Patent Application No. 2018-137188, filed Jul. 20, 2018, the contents of which are incorporated herein by reference in their entirety.

REFERENCE SIGNS LIST 1, 1A, 1B, 1C sensor, 2 seat, 3 posture adjusting member, 4 drive unit, 5 control unit, 6 posture adjusting device, 10 substrate, 10a upper surface of substrate, 10b lower surface of substrate, 20a, 20b functional layer, 21 seat cushion, 22 seat back, 22a pressure receiving surface, 23 headrest, 30, 30B, 30C resistor, 31, 31B, 32, 32B resistive portion, 41, 42 terminal section, 50 individual sensor, 51 analog front end unit, 52 signal processing unit

The invention claimed is:

1. A posture adjusting device comprising:
a support member with a pressure receiving surface to be pressed by a body of a user;
multiple posture adjusting members each configured to change an uneven state of the pressure receiving surface;
a sensor configured to output, when a given posture adjusting member is pressed by the body via the pressure receiving surface, a resistance value that constantly varies in accordance with a magnitude of a press force that is transferred via the given posture adjusting member;
a drive unit configured to independently drive each of the multiple posture adjusting members; and
a control unit configured to control the drive unit,
wherein the control unit is configured to:
identify the pressed posture adjusting member based on the output of the sensor, and control the drive unit to cause the pressed posture adjusting member to be moved or deformed to thereby cause the uneven state of the pressure receiving surface to change,
wherein the sensor includes:
an insulating layer;
a resistor including multiple first resistive portions of which a longitudinal direction of each is directed to a first direction and that are juxtaposed on one side of the insulating layer, and including multiple second resistive portions of which a longitudinal direction of each is directed to a second direction intersecting with the first direction and that are juxtaposed on another side of the insulating layer; and
a pair of electrodes provided at both end portions of each of the first resistive portions and the second resistive portions,
wherein each posture adjusting member is disposed at a location overlapping with a portion at which a given first resistive portion and a given second resistive portion intersect, in a plan view, and
wherein the press force applied from the body is transferred to the sensor via the given posture adjusting member, and at least one given resistive portion among the first resistive portions and the second resistive portions is pressed, so that the resistance value between a given pair of electrodes associated with the pressed at least one given resistive portion among the first resistive portions and the second resistive portions constantly varies in accordance with the magnitude of the press force.

2. The posture adjusting device according to claim 1, wherein location detection with respect to the first direction and the second direction is capable of being performed based on variation in a resistance value of the given first resistive portion and variation in a resistance value of the given second resistive portion.

3. The posture adjusting device according to claim 1, wherein the resistor is disposed in a zigzag pattern that is formed between the given pair of electrodes.

4. The posture adjusting device according to claim 1, wherein the resistor is formed of a chromium (Cr) composite film.

5. The posture adjusting device according to claim 4, wherein a main component of the resistor is alpha-chromium.

6. The posture adjusting device according to claim 5, wherein the resistor includes alpha-chromium at 80% by weight or more.

7. The posture adjusting device according to claim 5, wherein the resistor includes chromium nitride.

8. The posture adjusting device according to claim 1, further comprising a functional layer formed of a metal, an alloy, or a metal compound, in a lower layer of the resistor.

9. The posture adjusting device according to claim 8, wherein the functional layer includes a function of promoting crystal growth of the resistor.

10. The posture adjusting device according to claim 1, further comprising an electronic component provided on one surface side or another surface side of the insulating layer.

11. The posture adjusting device according to claim 10, wherein the electronic component is configured to convert the resistance value between the given pair of electrodes associated with a given resistor, into a voltage and to output the voltage as a digital signal.

12. A posture adjusting device comprising:
a support member with a pressure receiving surface to be pressed by a body of a user;
multiple posture adjusting members each configured to change an uneven state of the pressure receiving surface;
a sensor configured to output, when a given posture adjusting member is pressed by the body via the pressure receiving surface, a resistance value that constantly varies in accordance with a magnitude of a press force that is transferred via the given posture adjusting member;
a drive unit configured to independently drive each of the multiple posture adjusting members; and
a control unit configured to control the drive unit,
wherein the control unit is configured to:
identify the pressed posture adjusting member based on the output of the sensor, and control the drive unit to cause the pressed posture adjusting member to be moved or deformed to thereby cause the uneven state of the pressure receiving surface to change,
wherein the sensor is a collection of individual sensors that are assigned to the respective posture adjusting members,
wherein each individual sensor includes:
an insulating layer;
a resistor formed on one side of the insulating layer; and
a pair of electrodes provided at both end portions of the resistor, wherein each posture adjusting member is disposed at a location overlapping with a given individual sensor in a plan view, and wherein the press force applied from the body is transferred to at least one given individual sensor via the given posture adjusting member, and a given resistor is pressed, so that a resistance value between a given pair of electrodes associated with the pressed given resistor constantly varies in accordance with the magnitude of the press force.

* * * * *